Dec. 6, 1955  S. BIRK  2,726,301
THERMOSTATIC HEAT CONTROLLING MEANS
Filed March 13, 1953  3 Sheets-Sheet 1

INVENTOR
SOL BIRK,
BY Irving Seidman
ATTORNEY

Dec. 6, 1955 S. BIRK 2,726,301
THERMOSTATIC HEAT CONTROLLING MEANS
Filed March 13, 1953 3 Sheets-Sheet 2

INVENTOR
SOL BIRK,
BY
*Irving Seidman*
ATTORNEY

Dec. 6, 1955  S. BIRK  2,726,301
THERMOSTATIC HEAT CONTROLLING MEANS
Filed March 13, 1953  3 Sheets-Sheet 3

INVENTOR
SOL BIRK,
BY
Irving Seidman
ATTORNEY

United States Patent Office 2,726,301
Patented Dec. 6, 1955

2,726,301

THERMOSTATIC HEAT CONTROLLING MEANS

Sol Birk, Bronx, N. Y.

Application March 13, 1953, Serial No. 342,259

2 Claims. (Cl. 200—140)

This invention relates to a thermostatic heat controlling means and has particular reference to a thermostatically operated electrical break and make switch for maintaining a constant temperature in any type of heating mechanism.

An object of this invention is the provision therein of a means of expanding or contracting an expansible vapor within a bellows element which will expand or contract the bellows and coact with an electric switching element to make and break an electric circuit which energizes a heating unit when the element to be heated falls below a predetermined temperature or de-energize the heating unit when the temperature of same reaches a high point.

Another object of this invention resides in the provision therein of a means of fixing the temperature at a desired point. The said means being a visible graduated dial plate and pointer knob upon the housing which encloses the device.

A further object of this invention is to provide a device of the type set forth which may be made up of a few parts which are easily assembled and which may be produced at a minimum cost.

The invention consists essentially of an elongated open-ended housing of Bakelite or other suitable insulating material, which is attached to a bracket in a housing, which bracket supports a conventional expansible bellows adapted to coact with a make and break electric switch in the said open-ended housing. The expansion or contraction of the bellows being controlled by an expansible or contractable vapor within the said bellows and the expansion and contraction of the vapor being in turn controlled by the temperature of the element to be heated as it rises or drops above or below a predestined indicator setting upon a visible dial.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawing, in which.

Figure 1:
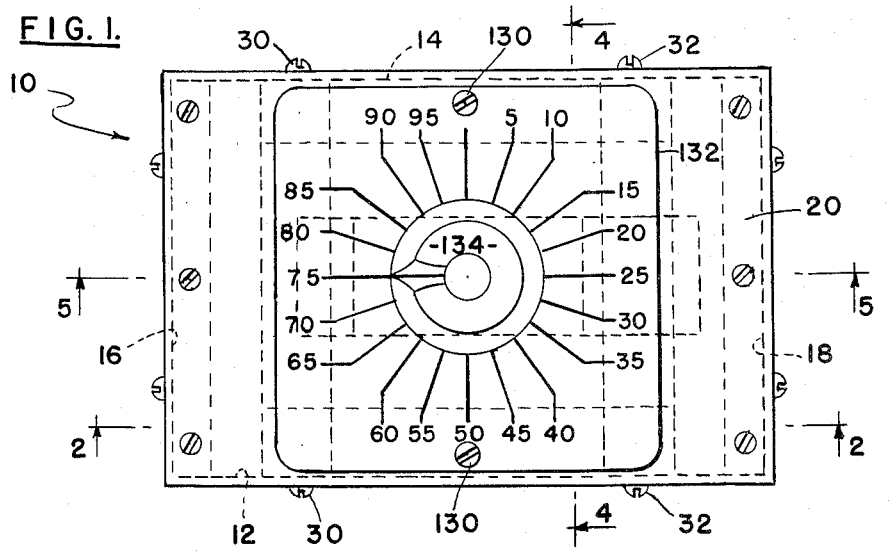
Fig. 1 is a top or plan view of a bottomless, over-all housing enclosing the invention and shows a graduated dial and pointer knob thereon.

Referring in detail to the parts in which similar reference numerals refer to similar parts throughout, 10 designates, generally, a heat controlling unit which comprises a main bottomless, over-all housing consisting of side walls 12 and 14, end walls 16 and 18 and a cover plate or top 20. Cross plates or supporting bars 22 and 24, which are formed with flanged ends 26 and 28 respectively, are disposed between the side walls 12 and 14 and are secured thereto by means of screws 30 and 32 respectively.

Figure 3:
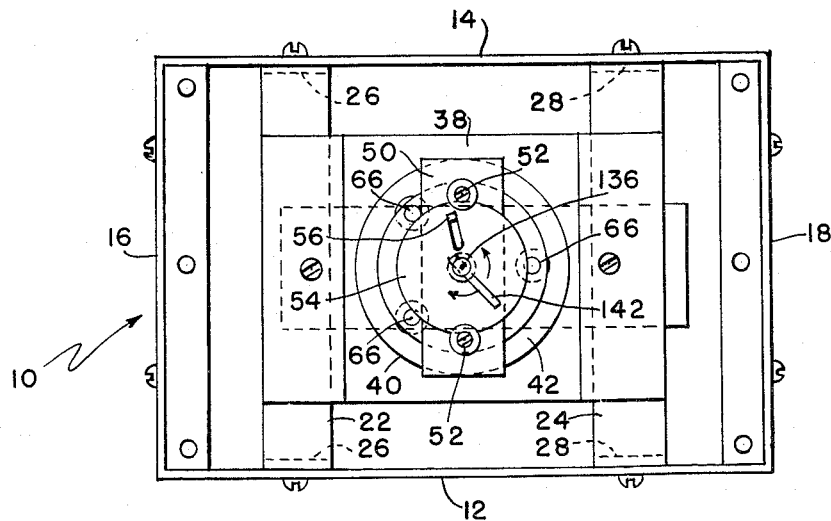
Fig. 3 is a top or plan view with the top or cover plate removed to expose the interior of the bottomless over-all housing.
Figure 4:
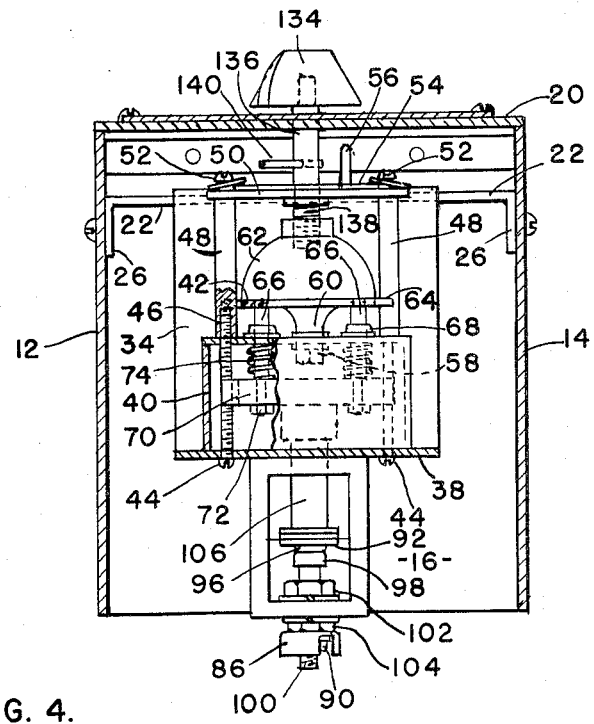
Fig. 4 is a transverse sectional elevation taken, approximately, along the line 4—4 of Fig. 1, and shows a part broken away.

To the supporting cross plates 22 and 24 there is suspended a U-shaped carrier having depending walls 34 and 36 and a platform 38. Upon the platform there rests a circular enclosing member 40 having a top plate 42, both circular enclosing member 40 and top plate 42 being held in place by screws 44 (Fig. 4), which engage through the platform 38 and top plate 42 and enter a threaded bore 46 in spacer posts 48. The said spacer posts extend upwardly and carry, upon their upper ends, a plate 50 which is secured to the spacer posts by screws 52 (Figs. 3 and 4). The said screws 52 also hold, securely in place, a disc 54 upon which there is formed an upwardly extending arm 56, its purpose being hereinafter explained.

Figure 2:
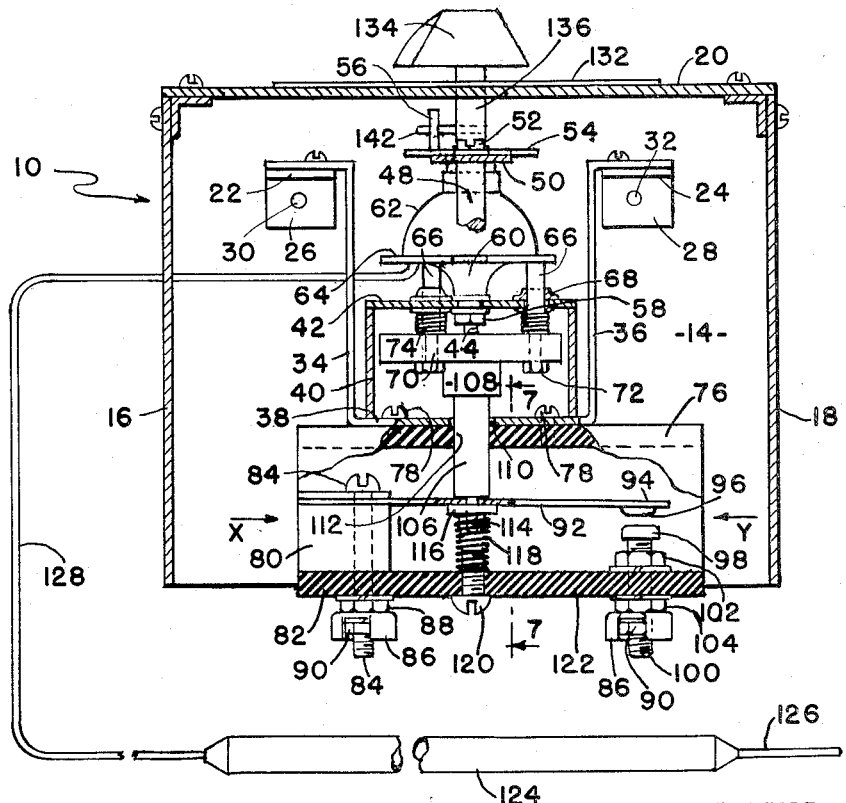
Fig. 2 is a sectional elevation taken along the line 2—2 of Fig. 1 and shows parts broken away and an electric switch element in open position.

Securely attached to the cover plate 42, by a nut 58 (Figs. 2 and 5) there is a lower funnel shaped portion 60 of a conventional expansion bellows (not shown), the upper portion of which contacts the upper-inside of a semi-spherical bellows housing 62. The said bellows housing 62 has an open lower end with an annular outwardly extending flange 64 to which there is attached depending pins 66. The said pins 66 have reciprocatory, vertical movement through the top plate 42 and pass through eyelets 68 which are secured to the top plate 42 and form a bushing for the said pins 66. The lower ends of the said pins 66 are threaded and pass through a disk 70 and are held thereon by nuts 72. Helical springs 74 encircle the pins 66 and are disposed between the top plate 42 and the disk 70. The above described mechanism and parts refer to a conventional expansible bellows which is not claimed as part of the present invention but is shown as employed to actuate an electric current controlling switch element which is shown attached thereto.

This switch element, which is the basis of the present invention comprises a hollow open-ended housing 76 of Bakelite or other suitable insulating material, is rectangular in cross-section, open at both ends and attached to the platform 38 by means of screws 78. At one end a block 80 of suitable insulating material is secured to the bottom 82 of the said open-ended housing 76, by means of a terminal screw 84 (Fig. 2) which has a wire attachment cup 86 and nuts 88 and 90. The said block 80, also carries upon it, disposed between the head of the terminal screw and said block, a flat spring switch arm 92 having a free end 94 to the under side of which there is welded a contact point 96.

Aligned with the contact point 96 is its complementary contact point 98 which is formed upon the head of a screw 100 which extends through the bottom 82 of the housing 76 and is securely held thereon by nuts 102 and 104 and may be adjusted to any desired height. A plunger 106, having a broadened head 108 of suitable insulating material, passes through an enlarged orifice 110 and through an orifice 112 in the housing 76. The lower end of the plunger 106 engages the flat spring 92 and is formed with a contracted portion or pin 114 (Fig. 2) which engages through an insulating button 116 against which a spring 118 engages. A screw 120, of plastic or any suitable material is threaded through the bottom 122 of the housing 76 and engages in the lower end of spring 118 and co-acting with the button 116, hold the spring 118 in position. The urge of the said spring 118 will normally hold the flat spring switch arm 92 in contact with the lower edge of the plunger 106. The terminal screw 100 is provided with a cap 86 and nut 90 similar to the cap, and nut upon the terminal screw 84.

An elongated tube 124 (to the trade known as a bulb), is sealed at one end, as at 126, and has a contracted tube 128 (known as a capillary), which leads from the bulb 124 to the expansible bellows within the bellows housing 62. The bulb is placed in close proximity to the element which is heated. When the vapor in the said tube rises above a fixed temperature, it will expand in the tube 124 and capillary 128, and will enter the bellows and cause same to expand and raise the bellows housing 62 (Fig. 2), drawing up the disk 70 against the urge of the springs 74 thereby breaking the circuit at the contact points 96 and 98.

Figure 5:
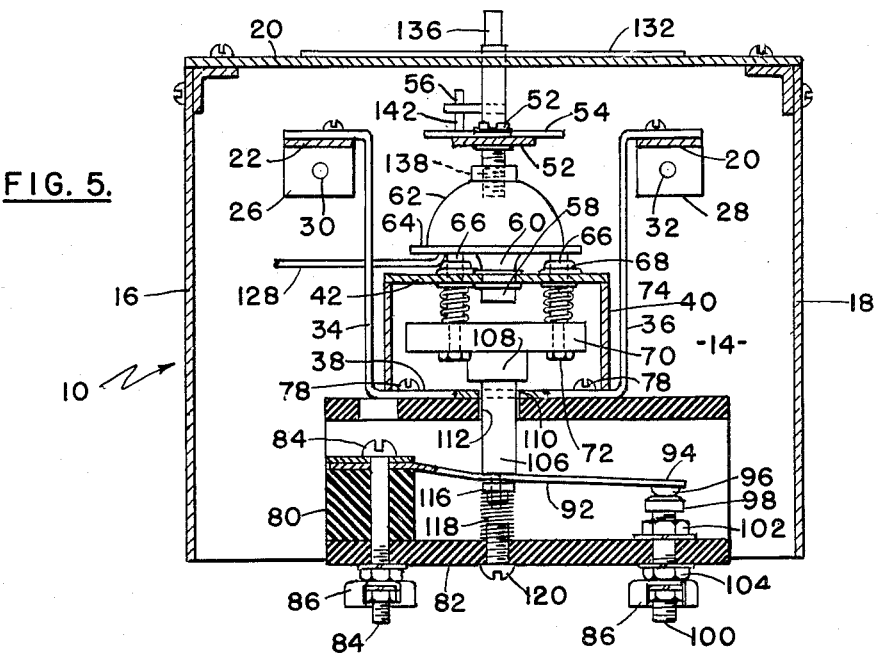
Fig. 5 is a longitudinal sectional elevation taken approximately along the line 5—5 of Fig. 1 and shows the electric switch element in closed position.
Figure 6:
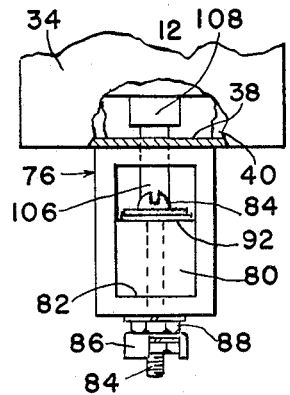
Fig. 6 is an end view of the switch element open-ended housing looking in the direction indicated by the arrow $x$ in Fig. 2.
Figure 7:
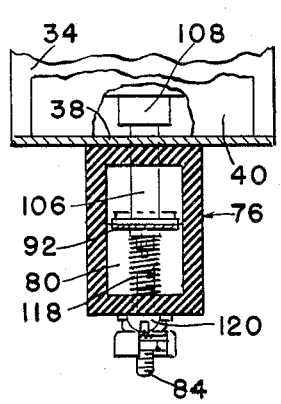
Fig. 7 is a cross section through the switch element, open-ended housing and is taken along the line 7—7 of Fig. 2.
Figure 8:
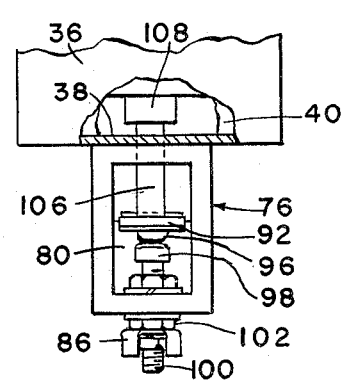
Fig. 8 is an end view of the switch element, open-ended housing and is taken in a direction indicated by the arrow Y in Fig. 2.

Upon the cover or top plate 20 there is attached, by means of screws 130 (Fig. 1), a dial plate 132 suitably marked to indicate temperature readings and a pointed knob 134 is mounted upon a rotatable shaft 136. The said shaft 136 extends through the dial plate 132 and cover 20, to the plate 50 and is threaded at its lower end into the head of the bellows, as at 138 (Figs. 4 and 5). By turning the knob 134, clockwise or counter-clockwise, the shaft 136 may be lowered or raised to adjust the position of the lower end of said shaft 136 with respect to the top of the bellows housing 62. The upright 56, heretofore mentioned, acts as a stop and engages a pin 140 which projects radially from the shaft 136 to limit the rotative motion of the shaft 136 and its attached knob 134.

Figure 9:
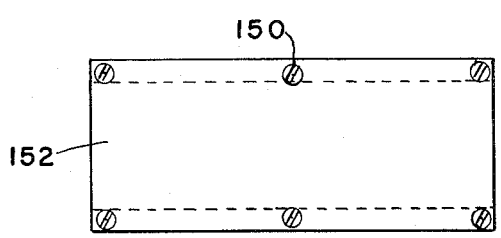
Fig. 9 is a side elevational view of a modified form of switch enclosing housing.
Figure 10:
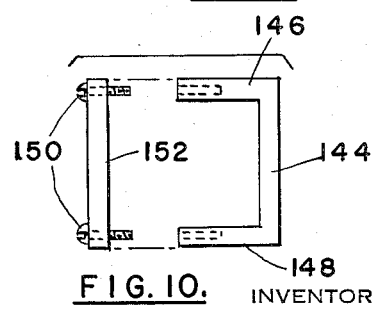
Fig. 10 is an exploded end view of the switch element, open-ended housing and shows a removable side wall withdrawn therefrom.

In Figs. 9 and 10, there is shown a modified embodiment of a switch element housing which comprises a channel shaped member having a wall 144, top 146 and bottom 148 respectively. To the open side there is attached, by screws 150, a cover side plate 152. This type of housing may be used to simplify the assembly of the parts within same.

I claim:

1. In combination, a thermostatic switch controlling unit having a bottomless over-all housing, a U-shaped carrier secured to and depending within said bottomless housing, adapted to support a bellows type expansion element, an open-ended housing of insulating material secured to and depending from the said U-shaped carrier, a spring switch arm secured, at one end in the said open-ended housing, a pair of terminal screws upon the said open-ended housing, one of the said terminal screws having electrical connection with the fixed end of said spring switch arm and the second of said terminal screws being aligned with the free end of said spring switch arm, spring means disposed between the base of the said open-ended housing and the under side of the said spring switch arm and adapted to urge the free end of said spring switch arm out of contact with the said second terminal screw, a plunger of insulating material extending upwardly from the said spring switch arm, through the said open-ended housing and through the base of said U-shaped carrier, the said plunger having reciprocal movement, a circular enclosing member upon the base of said U-shaped carrier, upstanding spacer posts secured to said circular housing, a top plate secured to said spacer posts and adapted to support a semi-spherical housing enclosing an expansion bellows, depending pins attached to the said bellows housing and slidably engaging through the top of the said circular housing, a disk secured to the lower end of said pins, springs engageable around said pins and disposed between the top of said circular housing and said disk and adapted to urge the said bellows housing upwardly, the said disk having contact with the upper end of said insulated plunger, the said semi-spherical bellows housing being open at its bottom and upper end of the bellows being secured within the said bellows housing while its lower end is fixed to the top of said circular housing, the said disk being given reciprocal movement by the expansion or contraction of the said expansible bellows unit and thereby opening or closing the said spring switch arm.

2. The combination in a thermostatic switch controlling unit as set forth in claim 1, wherein the said open-ended housing is formed with a removable side member.

References Cited in the file of this patent

UNITED STATES PATENTS

| | | |
|---|---|---|
| 1,661,349 | Sawyer | Mar. 6, 1928 |
| 2,260,014 | Ettinger | Oct. 21, 1941 |
| 2,434,696 | Holmes | Jan. 20, 1948 |
| 2,487,213 | Bender | Nov. 8, 1949 |